US010389753B2

(12) United States Patent
Kawashima et al.

(10) Patent No.: US 10,389,753 B2
(45) Date of Patent: Aug. 20, 2019

(54) SECURITY SYSTEM AND METHOD FOR INTERNET OF THINGS INFRASTRUCTURE ELEMENTS

(71) Applicant: NTT Innovation Institute, Inc., Palo Alto, CA (US)

(72) Inventors: Masahisa Kawashima, Palo Alto, CA (US); Moosa Choudhry, Palo Alto, CA (US); Go Yamamoto, Palo Alto, CA (US); Rich Boyer, Palo Alto, CA (US)

(73) Assignee: NTT INNOVATION INSTITUTE, INC., East Palo Alto, CA (US)

( * ) Notice: Subject to any disclaimer, the term of this patent is extended or adjusted under 35 U.S.C. 154(b) by 64 days.

(21) Appl. No.: 15/415,629

(22) Filed: Jan. 25, 2017

(65) Prior Publication Data
US 2018/0212768 A1 Jul. 26, 2018

Related U.S. Application Data

(60) Provisional application No. 62/449,553, filed on Jan. 23, 2017.

(51) Int. Cl.
*H04L 9/08* (2006.01)
*H04L 29/06* (2006.01)
*H04L 9/32* (2006.01)
(52) U.S. Cl.
CPC .......... *H04L 63/166* (2013.01); *H04L 9/3268* (2013.01); *H04L 63/0823* (2013.01); *H04L 63/0876* (2013.01); *H04L 63/101* (2013.01); *H04L 63/104* (2013.01); *H04L 63/20* (2013.01); *H04L 2209/805* (2013.01)

(58) Field of Classification Search
CPC ... H04L 9/3263; H04L 9/3265; H04L 9/3268; H04L 63/0428; G06F 21/6218; G06F 21/10; G06F 2221/2107; G06F 21/64
USPC ........................................................ 713/175
See application file for complete search history.

(56) References Cited

U.S. PATENT DOCUMENTS

| | | | |
|---|---|---|---|
| 7,912,698 B2 | 3/2011 | Statnikov et al. | |
| 8,135,718 B1 | 3/2012 | Das et al. | |
| 8,418,249 B1 * | 4/2013 | Nucci | G06F 21/552 706/20 |
| 8,621,203 B2 * | 12/2013 | Ekberg | H04L 9/321 713/156 |
| 8,762,298 B1 | 6/2014 | Ranjan | |

(Continued)

OTHER PUBLICATIONS

H. Larochelle et al. "An empirical evaluation of deep architectures on problems with many factors of variation" ACM ICML '07, p. 473-480 (8 pgs).

(Continued)

*Primary Examiner* — Farid Homayounmehr
*Assistant Examiner* — Sanchit K Sarker
(74) *Attorney, Agent, or Firm* — DLA Piper LLP (US)

(57) ABSTRACT

A security system and method are provided that manage the security of a plurality of internet of things (IoT) devices that are part of an enterprise infrastructure. The security system and method may use unspoofable tags wherein each unspoofable tag may be assigned to a category of IoT devices and each unspoofable tag may have a security policy rule assigned to the unspoofable tag (and thus the category of IoT devices) so that IoT devices that are part of the enterprise infrastructure are secured by the security policy rule.

32 Claims, 8 Drawing Sheets

(56) References Cited

U.S. PATENT DOCUMENTS

| | | | |
|---|---|---|---|
| 9,680,855 B2 | 6/2017 | Schultz | |
| 10,026,330 B2* | 7/2018 | Burford | G09B 5/125 |
| 10,140,381 B2* | 11/2018 | Trikha | G06F 16/986 |
| 2002/0052858 A1 | 5/2002 | Goldman et al. | |
| 2002/0138492 A1 | 9/2002 | Kil | |
| 2004/0128535 A1 | 7/2004 | Cheng | |
| 2006/0037080 A1 | 2/2006 | Maloof | |
| 2008/0220740 A1 | 9/2008 | Shatzkamer | |
| 2008/0279387 A1 | 11/2008 | Gassoway | |
| 2008/0294019 A1 | 11/2008 | Tran | |
| 2009/0028141 A1 | 1/2009 | Vu Duong et al. | |
| 2009/0254992 A1 | 10/2009 | Schultz et al. | |
| 2010/0007489 A1 | 1/2010 | Misra et al. | |
| 2010/0183211 A1 | 7/2010 | Meetz et al. | |
| 2010/0201489 A1 | 8/2010 | Griffin | |
| 2011/0291803 A1* | 12/2011 | Bajic | G08B 13/2462 340/10.1 |
| 2011/0299420 A1 | 12/2011 | Waggener et al. | |
| 2012/0167210 A1* | 6/2012 | Oro Garcia | H04L 63/1425 726/22 |
| 2013/0104238 A1* | 4/2013 | Balsan | G06Q 30/0207 726/26 |
| 2013/0111036 A1 | 5/2013 | Ozawa et al. | |
| 2014/0122370 A1 | 5/2014 | Jamal et al. | |
| 2014/0136846 A1 | 5/2014 | Kitze | |
| 2014/0201374 A1 | 7/2014 | Ashwood-Smith | |
| 2014/0219096 A1 | 8/2014 | Rabie et al. | |
| 2014/0237599 A1 | 8/2014 | Gertner | |
| 2014/0259170 A1 | 9/2014 | Amsler | |
| 2014/0317261 A1 | 10/2014 | Shatzkamer et al. | |
| 2014/0317293 A1 | 10/2014 | Shatzkamer | |
| 2014/0325231 A1 | 10/2014 | Hook et al. | |
| 2015/0019710 A1* | 1/2015 | Shaashua | H04W 4/70 709/224 |
| 2015/0033340 A1 | 1/2015 | Giokas | |
| 2015/0074807 A1 | 3/2015 | Turbin | |
| 2015/0082308 A1 | 3/2015 | Kiess et al. | |
| 2015/0227964 A1 | 8/2015 | Yan et al. | |
| 2015/0288767 A1 | 10/2015 | Fargano et al. | |
| 2015/0317169 A1 | 11/2015 | Sinha et al. | |
| 2015/0326535 A1 | 11/2015 | Rao et al. | |
| 2015/0333979 A1 | 11/2015 | Schwengler et al. | |
| 2015/0381423 A1 | 12/2015 | Xiang | |
| 2015/0381649 A1 | 12/2015 | Schultz et al. | |
| 2016/0006642 A1 | 1/2016 | Chang et al. | |
| 2016/0050161 A1 | 2/2016 | Da et al. | |
| 2016/0057234 A1 | 2/2016 | Parikh et al. | |
| 2016/0154960 A1 | 6/2016 | Sharma et al. | |
| 2016/0205106 A1* | 7/2016 | Yacoub | H04L 61/1511 726/28 |
| 2016/0248805 A1 | 8/2016 | Burns et al. | |
| 2016/0301709 A1 | 10/2016 | Hassanzadeh | |
| 2016/0352732 A1* | 12/2016 | Bamasag | H04L 9/085 |
| 2016/0364553 A1 | 12/2016 | Smith | |
| 2017/0093915 A1* | 3/2017 | Ellis | H04L 63/20 |
| 2017/0149804 A1 | 5/2017 | Kolbitsch | |
| 2017/0264597 A1* | 9/2017 | Pizot | H04L 63/0442 |
| 2017/0310485 A1* | 10/2017 | Robbins | H04L 9/16 |
| 2018/0212768 A1* | 7/2018 | Kawashima | H04L 9/3268 |
| 2018/0337958 A1* | 11/2018 | Nagarkar | H04L 63/0227 |
| 2019/0075455 A1* | 3/2019 | Coulier | H04W 12/04 |

OTHER PUBLICATIONS

J. Bergstra et al. "Random Search for Hyper-Parameter Optimization" Journal of Machine Learning Research 13 (2012), p. 281-305 (25 pgs).

Wikipedia—anonymous—https://en.wikipedia.org/wiki/Decision_tree (5 pgs).

Wikipedia—anonymous—https://enwikipedia.org/wiki/Support_vector_machine(16 pgs).

Wikipedia—anonymous—https://enwikipedia.org/wiki/K-nearest_neighbors_algorithm (11 pgs).

Wikipedia—anonymous—https://en.wikipedia.org/wiki/Gradient_boosting (8 pgs).

Wikipedia—anonymous—https://en.wikipedia.org/wiki/Naive_Bayes_classifier (10 pgs).

Wikipedia—anonymous—https://en.wikipedia.org/wiki/Bootstrap_aggregating (3 pgs).

Wikipedia—anonymous—https://en.wikipedia.org/wiki/Logistc_regression (14 pgs).

Wikipedia—anonymous—https://en.wikipedia.org/wiki/AdaBoost (12 pgs).

Kaggle—https:/www.kaggie.com/wiki/Home (2 pgs.).

Wikipedia—anonymous—TLS: Transport Layer Security Protoco—Webpage https://en.wikipedia.org/wiki/Transport_Layer_security (1 pgs/).

NIST—National Insitute of Standards and Techology, US Department of Commerce "Computer Security Resource Center" AES Algorithm With Galois Counter Mode of Operation. Webpage https://csrc.nist.gov/projects/block-cipher-techniques/bcm (3 pgs.).

Moriarty, et al. PKI Certificate—PKCS #12: Personal Information Exchange Syntax v1.1—Webpage https://tools.ietf.org/html/rfc7292 (30 pgs.).

ITU—International Telecommunication Union—Open Systems Interconnection-X.509: Information Technology—Public-key and attribute framework certificate—Webpage http://www.itu.int/rec/T-REC-X.509/enn (2 pgs.).

Groves, M., Sakai-Kasahara Key Encryption (SAKKE)—Internet Engineering Task Force dated Feb. 2012—Webpage https://tools.ietf.org/html/rfc6508 (22 pgs.).

Barbosa, L. et al.—SK-KEM: An Identity-Based Kem, Algorithm standardized in IEEE—Webpage http://grouper.ieee.org/groups/1363/IBC/submissiions/Barbosa-SK-KEM-2006-06.pdf (20 pgs.).

Boyen-X, et al—Identity-Based Cryptography Standard (IBCS) #1: Supersingular Curve Implementations of the BF and BB1 Cryptosystems, dated Dec. 2007—Webpage https://tools.ietf.org/html/rfct091 (64 pgs.).

An Amazon.com company @ Alexa—Webpage: https://www.alexa.com/siteinfo (5 pgs.).

Stouffer, K. et al.—"The National Institute of Standards & Technology(NIST) Industrial Control System (ICS) security guide" dated May 2015 (247 pgs.).

Auto-WEKA webpage printed regarding algorithms (2 pages) (Chris Thornton et al.) Feb. 17, 2015.

Ayat, N.E.; Cheriet, M.; Suen, C.Y.; "Automatic Model Selection for the optimization of SVM Kernels," Mar. 21, 2005 (35 pages).

Brodley, Carla E., "Addressing the Selective Superiority Problem: Automatic Algorithm/Model Class Selection," (1993) (8 pages).

Chapelle, Olivier; Vapnik, Vladimir; Bousquet, Olivier; Mukherjee, Sayan; "Choosing Multiple Parameters for Support Vector Machines," Machine Learning, 46, 131-159, 2002 © 2002 Kluwer Academic Publishers (29 pages).

Lee, Jen-Hao and Lin, Chih-Jen, "Automatic Model Selection for Support Vector Machines, pp. 1-16" (2000).

Smith, Michael R.; Mitchell, Logan; Giraud-Carrier, Christophe; Martinez, Tony; "Recommending Learning Algorithms and Their Associated Hyperparameters," Jul. 7, 2014 (2 pages).

Thornton, Chris. Thesis: "Auto-WEKA: Combined Selection and Hyperparameter Optimization of Supervised Maching Learning Algorithms," Submitted to the University of British Columbia, Mar. 2014 (75 pages).

Thornton, Chris; Hutter, Frank; Hoos, Holger H.; Leyton-Brown, Kevin. "Auto-WEKA: Combined Selection and Hyperparameter Optimization of Classification Algorithms," Mar. 2013 (9 pages).

Wolinski, Christophe; Kuchcinski, Krzysztof. "Automatic Selection of Application-Specific Reconfigurable Processor Extensions." *Design, Automation & Test in Europe Conference* (Date '08), Mar. 2008, Munich, Germany, pp. 1214-1219 (7 pages).

Workshop Handout edited by Joaquin Vanschoren, Pavel Brazdil, Carlos Soares and Lars Kotthoff, "Meta-Learning and Algorithm Selection Workshop at ECAI 2014," MetaSel 2014, Aug. 19, 2014 (66 pages).

(56) References Cited

OTHER PUBLICATIONS

Chih-Fong, T. et al. Intrusion Detection by Machine Learning: A Review: dated 2009; p. p 11994-12000 (11 pgs.).

* cited by examiner

SECURITY SYSTEM AND METHOD FOR INTERNET OF THINGS INFRASTRUCTURE ELEMENTS

PRIORITY CLAIM

This application claims the benefit under 35 USC 119(e) and 35 USC 120 to U.S. Provisional Patent Application Ser. No. 62/449,553, filed on Jan. 23, 2017 and entitled "Security System and Method For Internet of Things Infrastructure Elements", the entirety of which is incorporated herein by reference.

FIELD

The disclosure relates generally to a system and method for securing an infrastructure that includes internet of things (IoT) devices.

BACKGROUND

Many enterprises have an information technology (IT) infrastructure that supports the various computing device used by the enterprise. More recently, there are many internet of things (IoT) devices with each IoT device being a physical object that features an IP address for internet connectivity and communicates with other internet-enabled devices and systems. For example, an IoT device may be a thermostat or other internet-connected device. These IoT devices may form part of the IT infrastructure of an enterprise. Unlike other elements of an IT infrastructure, these IoT devices have a number of serious security issues and technical problems that make them a threat to the security of the IT infrastructure of an enterprise. For example, the IoT devices are not deployed in a data center environment so that the traditional security features/services that protect data center elements cannot protect the IoT devices. Furthermore, a majority of these IoT devices have weak access mechanisms so that these IoT devices have vulnerabilities including password security, encryption and a general lack of granular user access permissions. In addition, the IoT devices exist across many networks, not just inside the data center (DC) so that the IoT devices may be exposed to the weaknesses of local LANs including physical and logical compromise as well as security interference. Furthermore, many of the IoT devices allow their software and firmware to be overwritten with few controls that creates a significant security vulnerability. Finally, the IoT devices are always connected and always on so that the IoT devices are perfect infiltration and compromise points for the infrastructure.

The National Institute of Standards and Technology (NIST) has issued a guide to industrial control systems (ICS) security (the "Guide") that may be found at http://nvlpubs.nist.gov/nistpubs/SpecialPublications/NIST.SP.800-82r2.pdf that is incorporated herein by reference. The Guide has a section that suggests that network segmentation and segregation is one of the most effective architectural concepts that an organization can implement to protect its ICS that includes an IT infrastructure. The Guide states that there are four common techniques to implement the security that may include: 1) technologies at more than just the network layer; 2) controls using least privilege and need-to-know (whitelist-based control); 3) separate information and infrastructure including separation of applications and policy enforcement points; and 4) implementing whitelisting. The Guide also suggests that firewalls can further restrict ICS inter-subnet communications between functional security subnets and devices. By employing firewalls to control connectivity to these areas, an organization can prevent unauthorized access to the respective systems and resources within the more sensitive areas.

Thus, it is desirable to provide an infrastructure architecture that provides better security for IoT devices that are part of an IT infrastructure using access privileges and segregation techniques and it is to this end that the disclosure is directed.

DETAILED DESCRIPTION OF ONE OR MORE EMBODIMENTS

The disclosure is particularly applicable to an information technology (IT) infrastructure having IoT devices or services as well as a data center and traditional IT components and it is in this context that the disclosure will be described. It will be appreciated, however, that the system and method has greater utility, such as to other IT infrastructures that may have slightly different architectures.

Figure 1:
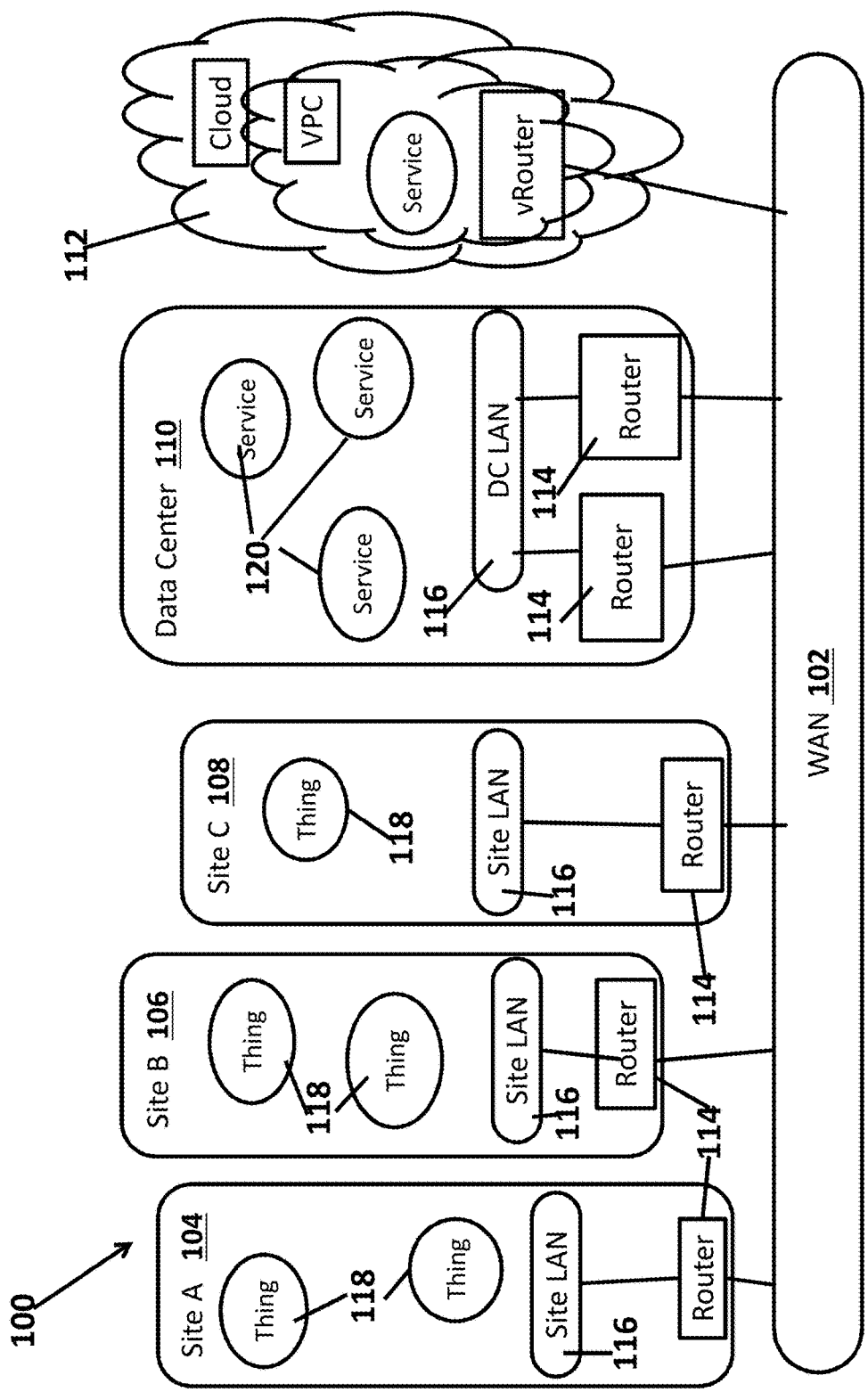
FIG. 1 illustrates an example of information technology (IT) infrastructure having Internet of Things (IoT) devices.

FIG. 1 illustrates an example of information technology (IT) infrastructure 100 having Internet of Things (IoT) devices in which it is desirable to enhance the security of the infrastructure 100 as disclosed below. The infrastructure 100 may have a wide area network (WAN) 102 that interconnects a plurality of infrastructure elements. In a simple example shown in FIG. 1, the infrastructure may include a first site 104, such as an office site or a site of the enterprise, a second site 106, such as an office site or a site of the enterprise, a third site 108, such as an office site or a site of the enterprise, a data center 110 and a cloud system 112. Each site 104-108 of the infrastructure may include a router 114 that may be a hardware/software device that routes digital data traffic and communications as is well known, a local area network (LAN) 116 connected to the router that acts as the communication path for each site (using wired or wireless technology) and one or more computing resources that are part of the infrastructure including one or more internet of things (IoT) devices ("Thing") 118. Each Thing may be a process control system device, a thermostat, a video conferencing system and the like that form part of the infrastructure, but each Thing may be weak from a security standpoint as described above. The security weakness of each IoT device being used as part of the infrastructure is a technical problem that may be solved by the security system and method described below.

The data center 110 may also have a router 114 and a data center LAN 116. The router 114 and the LAN 116 permit the various infrastructure elements to be connected to each other and communicate with each other through the LANs, routers and WAN. The data center 110 may have one or more Services 120 that provide various functions and/or operations of the infrastructure 100. The cloud system 112 may have a virtual router (vRouter) and one or more services.

In operation, each of the infrastructure elements of the system 100 may communicate with the other infrastructure elements to perform the operations and functions of the infrastructure 100, such as communicating data, services, etc. Due to this communication and connectivity, the security weakness of the one or more Things 118 results in a security weakness of the overall infrastructure for the reasons set forth above. The below described security system and method solves the security weakness technical problem using a transport layer security (TLS) screen system and other elements as described below that provides a technical solution to the technical problem of insecure IoT devices in an infrastructure. Further details generally of the TLS protocol may be found at https://en.wikipedia.org/wiki/Transport_Layer_Security which is incorporated herein by reference. Furthermore, while business developers in enterprises will want to continuously add/update IoT applications and/or IoT devices, the security system and method allows the distribution of new Things 118 and Services 120 with enough agility for the enterprise while permitting corporate IT to ensure that the deployed Things 118 and Services 120 are protected from threats.

Figure 2:
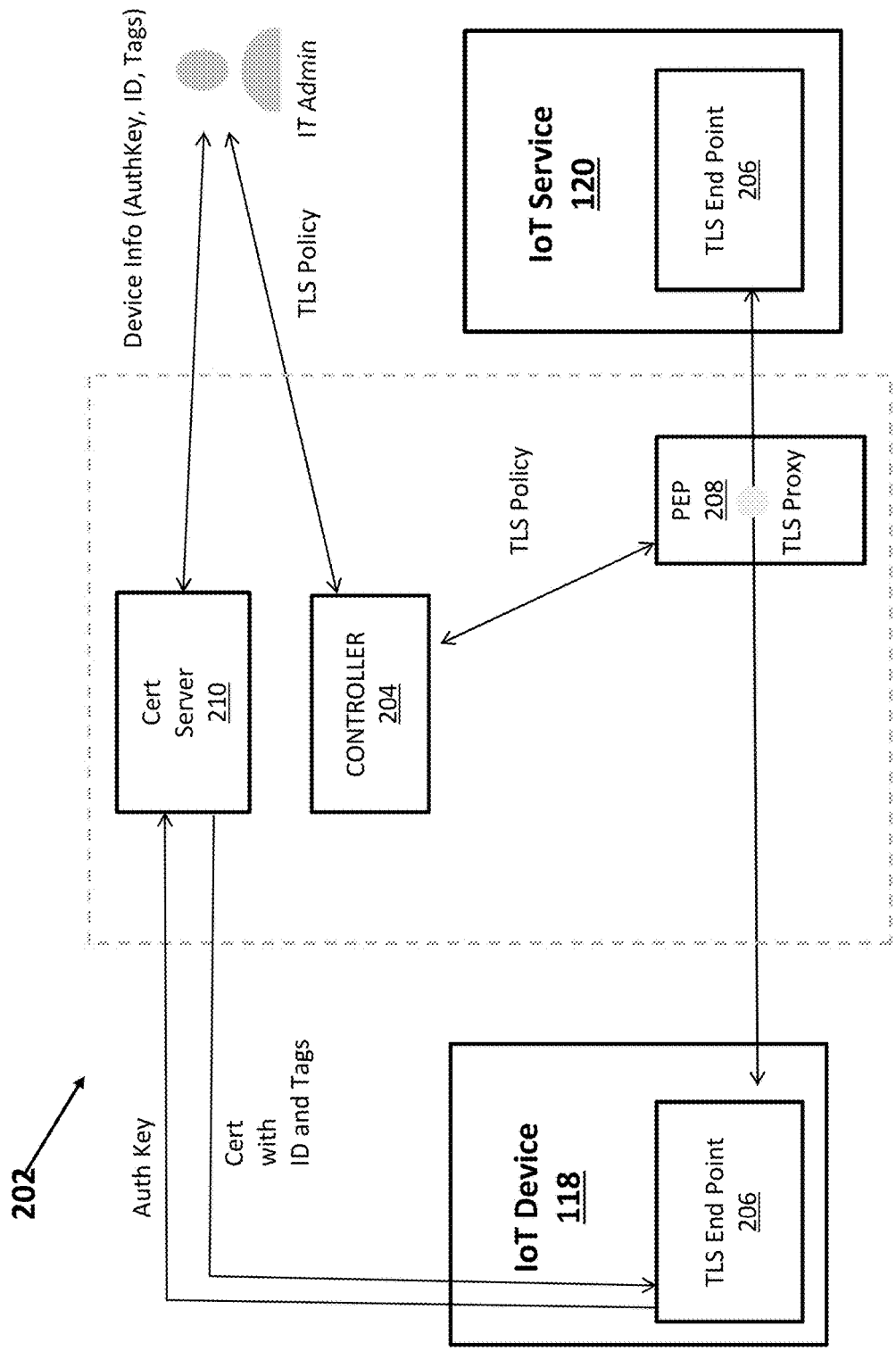
FIG. 2 illustrates functional elements of an IoT device security mechanism.

FIG. 2 illustrates functional elements of an IoT device security mechanism. The IoT device security mechanism may be used, for example, in the enterprise infrastructure 100 shown in FIG. 1. The security mechanism, as shown in the example implementation in FIG. 2, may be integrated into an enterprise infrastructure and may manage and enforce security across the enterprise infrastructure including communications between the IoT devices 118 and the Services 120 that are part of the enterprise infrastructure. Examples of the devices 118 that may be managed by the security mechanism (and be part of the enterprise infrastructure) may include a thermo sensor, a temperature sensor, a humidity sensor, a fan, an air conditioner, a motor, a manufacturing robot controller, a printer, a computer, a smartphone, a camera, a microphone, a speaker on any other device that has a connection to a network. Examples of the Services 120 that may be managed by the security mechanism (and be part of the enterprise infrastructure) may include a factory environment management service, a manufacturing robot management service, a video surveillance service and any other service that provides a service to the enterprise infrastructure.

The security mechanism/system may include a TLS security mechanism 202 that secures and manages the communications between each device 118 and each Service 120. Thus, the TLS security mechanism 202 may segregate the less secure IoT devices (such as Things 118 and Services 120) from the other elements of the enterprise infrastructure. The TLS security system 202 may include one or more functional elements including a controller 204, one or more policy enforcement points (PEPs) 208 and a certification server 210.

Each functional element of the TLS security mechanism 202 may be implemented in software or hardware or a combination of hardware and software. When a functional element of the TLS security mechanism 202 is implemented in software, it may be a plurality of lines of computer code/instructions that may be executed by a processor of a computing resources on which the functional element of the TLS security mechanism 202 resides wherein the instructions/code configure the processor and implement the functions/operations/algorithms of the functional element of the security mechanism. When the functional element of the TLS security mechanism 202 is implemented in hardware, the functional element may be implemented using an integrated circuit, a state machine, a programmed logic device, a microprocessor or a microcontroller wherein the hardware device performs the functions/operations/algorithms of the functional element of the security mechanism. Each functional element of the TLS security mechanism 202 may also be implemented as a combination of software and hardware.

The TLS security mechanism 202 may sit between each device 118 and each Service 120 and manage the communications and access between the relatively insecure IoT device 118 and the Service 120. Each of the IoT device 118 and the Service 120 may include a TLS end point element 206 that allows the TLS security mechanism 202 to authenticate each device 118 or Service 120 and control the access and interaction between the device 118 and the Service 120. Each TLS end point 206 may be a hardware element or a piece of software that is embedded/added to the IoT device 118 or Service 120. When the TLS end point 206 is a piece of software, it may be a plurality of lines of computer code/instructions that may be executed by a processor of the IoT device 118 or a processor of the host for the Service 120 that configures the IoT device 118 or Service 120 to operate using the TLS security mechanism 202.

The controller 204 controls the TLS security mechanism 202 and may be a plurality of lines of computer code/instructions that are executed by a processor or a hardware device. In alternate embodiments, the controller 204 may store a plurality of security policy rules in a policy engine and may provide an ability to generate/assign a security policy rule to an unspoofable tag.

The certification server 210 may be implemented as a piece of hardware (such as a dedicated certification server). The certification server 210 also may be implemented using software in which there may be a plurality of lines of computer code/instructions that may be executed by a processor of the hardware that hosts the certification software, such as a server computer, in which processor is configured by the executed plurality of instructions to perform the functions and operations of the certification server 210. For example, the certification server 210 may receive an authentication key from each IoT device 118 or Service 120 (from the TLS end point 206 that is associated with the IoT device 118 or Service 120). The certification server 210 may determine if the category of IoT device has already been assigned an unspoofable tag. If a tag is associated with the IoT device 118, the certification server 210 may return a certificate with the ID and the tags to the TLS end point 206 associated with the particular IoT device 118. The certification server 210 may also generate and assign unspoofable tags.

The authentication key may be, in different embodiments, a well-known MAC address or a universally unique identifier (UUID) that is assigned to each IoT device 118 or Service 120. When an IoT device 118 or Service 120 does not have a valid certificate, it sends a certificate request to the certification server 210. Then, the certification server 210 may generate a certificate with the ID and the unspoofable tag for the IoT device 118 or Service 120. The certification server 210 may be connected to the IT administrator who is also connected to the controller 204. The certification server 210 may also exchange data (the device information including the authentication key for each device, the ID and the tag) with the IT administrator. The IT administrator may also generate and distribute TLS policies to the controller 204.

FIG. 2 shows a simple IoT security mechanism with a device 118 and a Service 120 for illustration purposes. However, it is understood that the IoT security mechanism may operate with a plurality of devices 118 and a plurality of Services 120. In the more complex case, the security mechanism 202 would include the certification server 210 and controller 204 that handle the certificates and policies for each device 118 and Service 120, a TLS end point 206 associated with each device 118 or Service 120 and one or more PEPs 208.

Figure 7:
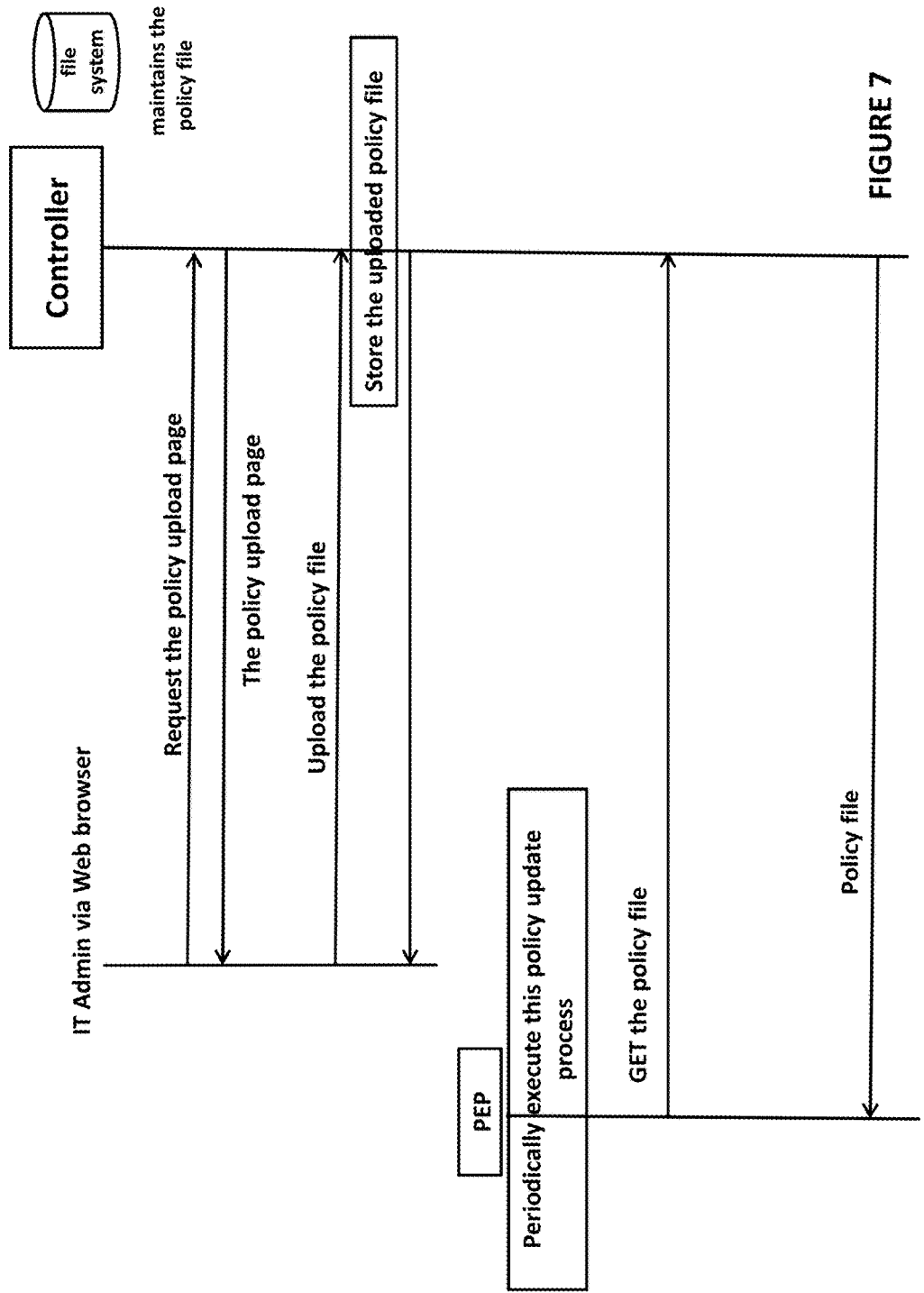
FIG. 7 illustrates a method for policy administration and distribution.
Figure 8:
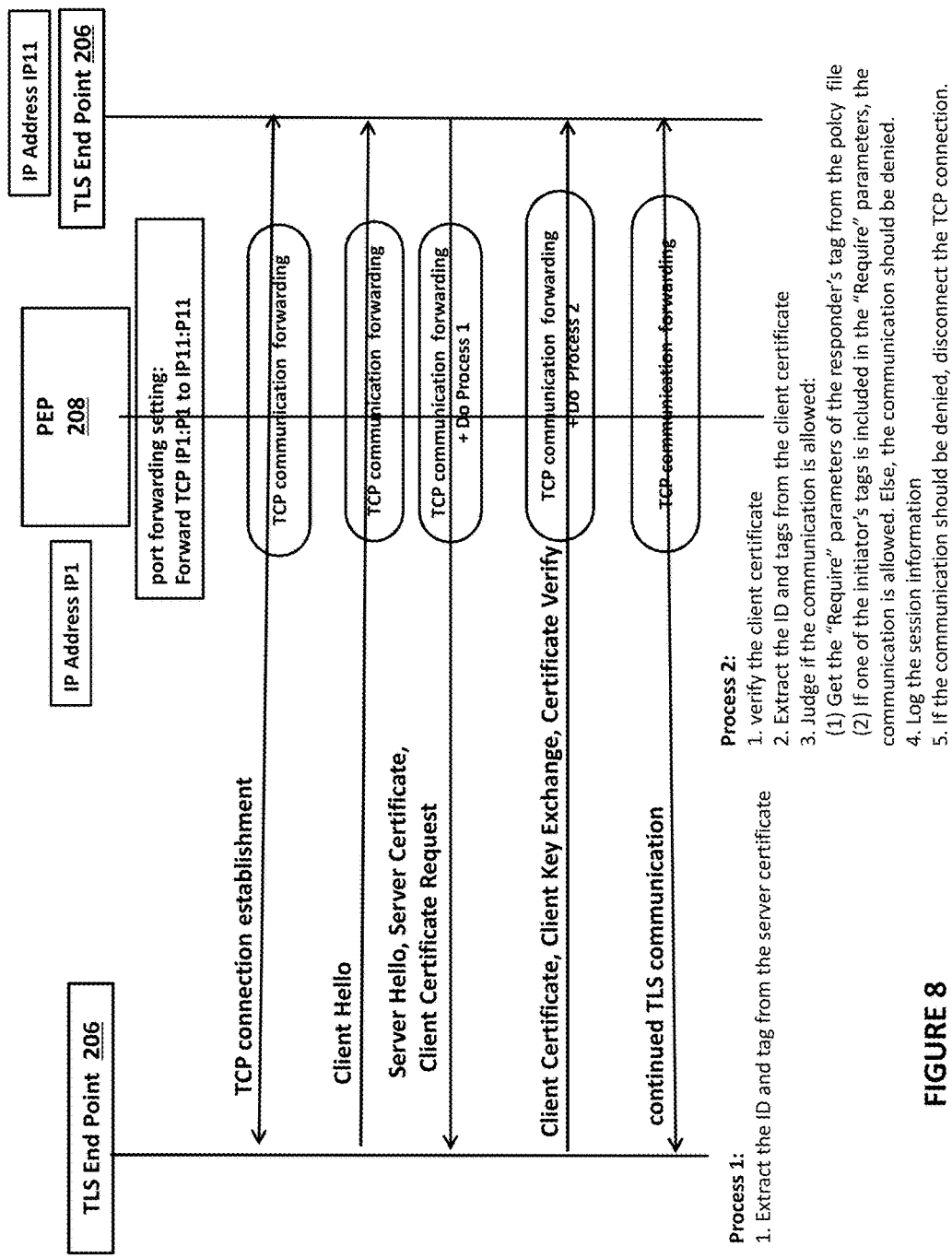
FIG. 8 illustrates a method for monitoring and policy enforcement on communications.

Each policy enforcement point (PEP) 208 may be controlled by the controller 204 to enforce the security policy for each IoT device 118 or Service 120. Each PEP 208 may include a TLS proxy that downloads/enforces the TLS policy that may also be part of the security system shown in FIG. 2. Each PEP 208 may be implemented in hardware or software. If implemented in hardware, each PEP 208 may be a hardware device, such as an integrated circuit or other piece of hardware that is capable of performing the operations of the PEP 208 including the TLS proxy. If implemented in software, each PEP 208 may be a plurality of lines of computer code/instructions that are executed by a processor of the computer system that hosts the PEP 208 so that the processor is configured to perform the operations of the PEP 208 and the TLS proxy. The TLS proxy may be implemented as a plurality of lines of instructions running on an operating system, such as Linux. Each PEP 208 monitors the IoT device 118 or Service 120 and its access or communications with the rest of the infrastructure. Each PEP may also perform filtering and monitoring as shown in FIG. 8 and described in more detail below. For the purpose of policy enforcement, each IoT device 118 or Service 120 is configured to execute TLS communications through the PEP 208. Each PEP 208 may be physically separate from the IoT device 118 or Service 120 or may be collocated with the IoT device 118 or Service 120. Each PEP 208 then manages the security policy rule for that IoT device 118 or Service 120. The security policy may be downloaded into each PEP 208 as shown in FIG. 7 and described in more detail below.

Figure 6:
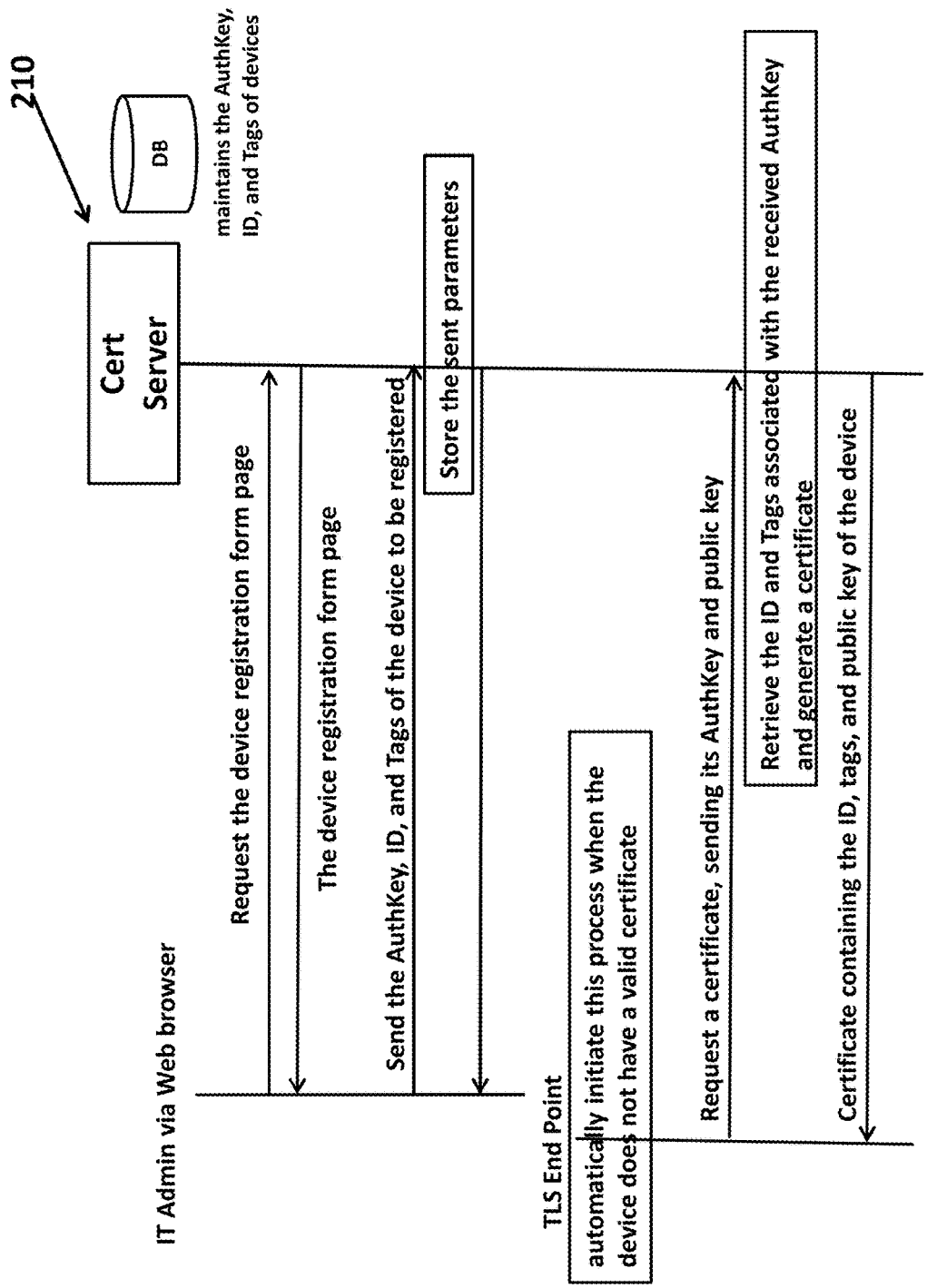
FIG. 6 illustrates a IoT device registration method.

The certification server 210 and/or the controller 204 of the security mechanism 202 may include one or more modules/components/engines that perform particular tasks/operations of the security mechanism 202. Each of the modules/components/engines may be implemented as a piece of hardware or a plurality of lines of computer code/instructions executed by a processor so that the processor is configured to perform various operations. The certification server 210 and/or the controller 204 of the security mechanism 202 may include a module/component/engine for discovering/identifying IoT devices 118 or Services 120 that are part of the enterprise infrastructure. In the system, a corporate IT administrator of the enterprise infrastructure may first register the authentications keys/credentials for each new IoT device that is part of the enterprise infrastructure so that the system can then detect each device based on the authentications keys/credentials that are stored in the system. Furthermore, the process for registering devices/services is shown in FIG. 6 and described below in more detail.

Figure 3:
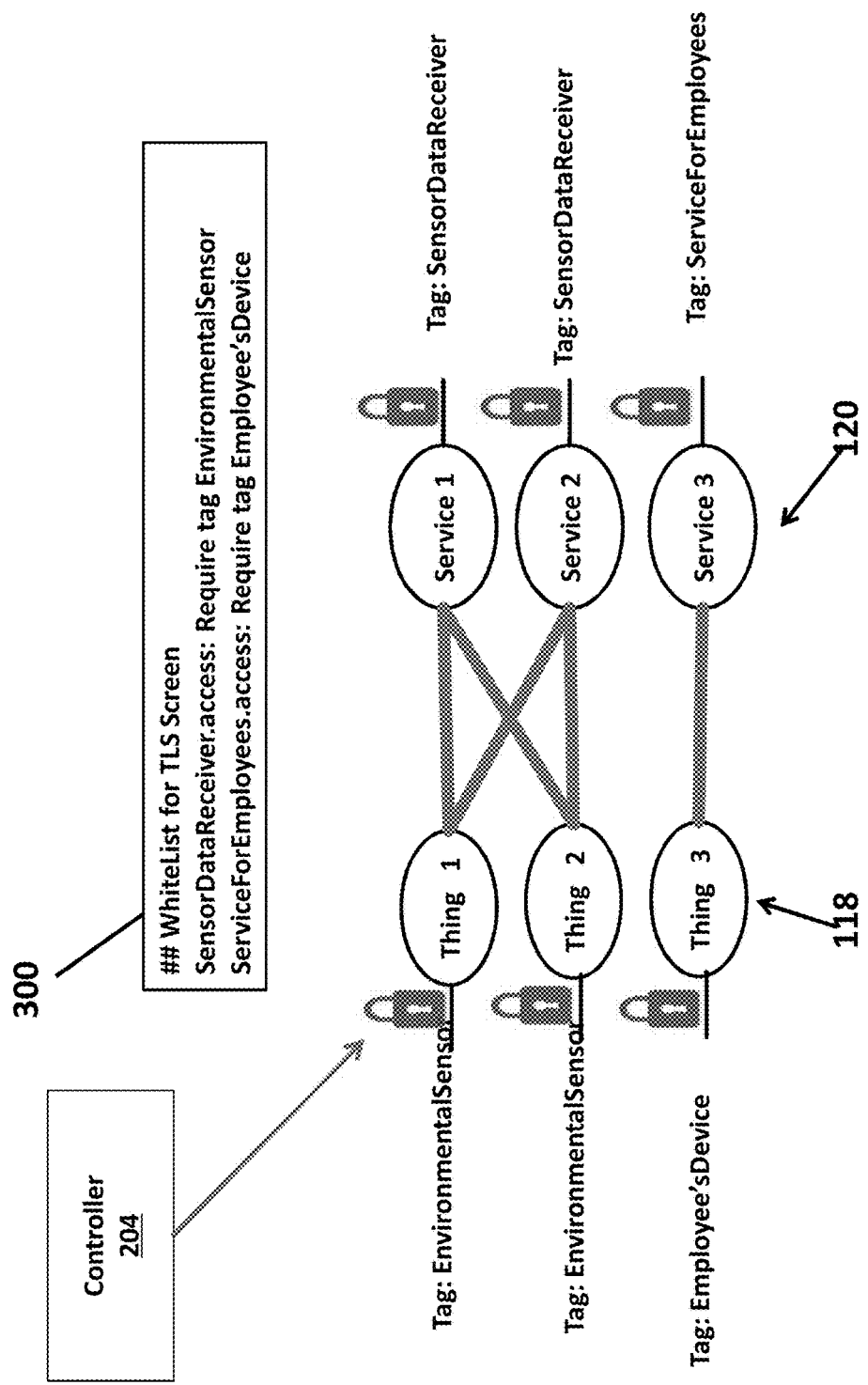
FIG. 3 illustrates an example of how security policies may be defined in the security system.

The certification server 210 of the security mechanism 202 also may include a tag engine that may generate, as needed, new unspoofable tags or assign an existing unspoofable tag to a IoT device 118 or Service 120. The types of the tags may vary, but may be, for example, the environmental sensor tag, the employee device, the sensor data receiver and the service for employees examples described below. Further details of the process to generate the tags and certificates are described below in more detail. The system assigns an unspoofable tag to each class/category of IoT devices (Things 118 or Services 120). Thus, each individual IoT device or service does not require its own identifier which would be infeasible given the potentially large number of IoT devices that may be part of the enterprise infrastructure. An example of the different category of IoT devices/tags is shown in FIG. 3. For example, the environmental sensor IoT device and tag has the characteristics of an environmental sensor while the other tags have different characteristics.

The tag engine may generate/issue a public key certificate that certifies associated tags to a particular category/class of IoT device (Thing 118 or Service 120). The public key certificate that is issued with each tag makes the tag unspoofable since it is impossible to fake the public key certificate by malware or other nefarious entities. Furthermore, by defining authorization policies (such as whitelists) with reference to unspoofable tags, IT administrators can reduce cost and manual overhead in policy management and provide better security to the enterprise infrastructure with the IoT devices.

The certification server 210 of the security mechanism 202 also may include a security policy storage and engine that manages the security policies enforced by the PEP 208 and stores the security policies for the system that may be controlled by the IT administrator. The security mechanism 202 ensures that the policy on TLS traffic is enforced using the TLS end points and the PEP. The security mechanism 202 ensures that the management of the security policies is centralized. Since the security mechanism 202 is positioned as shown in FIG. 2, the security mechanism 202 can enforce authorization security policies (such as one or more whitelists) across each of the infrastructure elements of the enterprise infrastructure and for data and communication traffic passing through each of the infrastructure elements.

FIG. 3 illustrates an example of how security policies are defined in the system described above. Specifically, FIG. 3 illustrates the Things (IoT devices) 118, such as Thing 1, Thing 2 and Thing 3 in the example in FIG. 3 and the allowed communications (due to the security policies) to one or more Services 120, such as Service 1, Service 2 and Service 3 in the example in FIG. 3 using the security mechanism 202 and its components described above. Each Thing 118 and each Service 120 has the associated unspoofable tag (such as EnvironmentalSensor, Employee's Device for the Things 118 and SensorDataReceiver and ServiceForEmployees for the Services 120 in the example in FIG. 3). Each unspoofable tag is associated with a category of IoT device, such as environmental sensor or sensor data receiver, so that one or more IoT device as shown in FIG. 3 may be associated with the same unspoofable tag. FIG. 3 also illustrates an example a security policy/rule 300 that may be associated with a particular unspoofable tag. Note that the security policy/rule for each IoT device category may be different and each security policy may include one or more security rules. In the example in FIG. 3, the security policy for a sensor data receiver and a service for employees may implement a whitelist and may include two security rules that are:

SensorDataReceiver.access: Require tag EnvironmentalSensor

ServiceForEmployees.access: Require tag Employee'sDevice

Thus, each security policy defines the allowable communications with respect to tags assigned to the IoT device 118 or Service 120. Furthermore, each security rule defines that access, such as for the SensorDataReceiver IoT device type, requires a particular tag, such as the EnvironmentalSensor tag for the SensorDataReceiver. FIG. 3 illustrates an example of several unspoofable tags and a security policy, but the system and method may have a plurality of different unspoofable tags (for a plurality of different types of IoT devices) and also a plurality of different security policies wherein each security policy may implement a whitelist model and may contain one or more security rules. Each security policy and security rule may be different and unique depending on the type of IoT device. Also, each security policy may associate unspoofable tags to each other as shown in the example in FIG. 3. Once the tags are assigned to each IoT device 118 and each Service 120 and there is a security policy defined for each tag (with one example shown in FIG. 3), the security mechanism 202 (using the PEP 208 and the TLS end points 206) will allow those communications permitted by the security policy shown by the blue arrows in FIG. 3 between the IoT devices 118 and the Services 120 and block any other communications. Thus, each security rule/policy may implement access rules for each IoT device category. In one implementation, a whitelist may be used for the access rules. The plurality of security rules for the plurality of IoT device categories may provide a technical solution that segregates any IoT devices and its communications to thus reduce the security weaknesses of the IoT devices. The above construction of the security policy/rule for each category of IoT device 118 or Service 120 significantly reduces the size of the policy file (containing all of the security policies/rules) as compared to traditional ID based whitelists in which a security policy is required for each IoT device 118 or Service 120.

Figure 4:
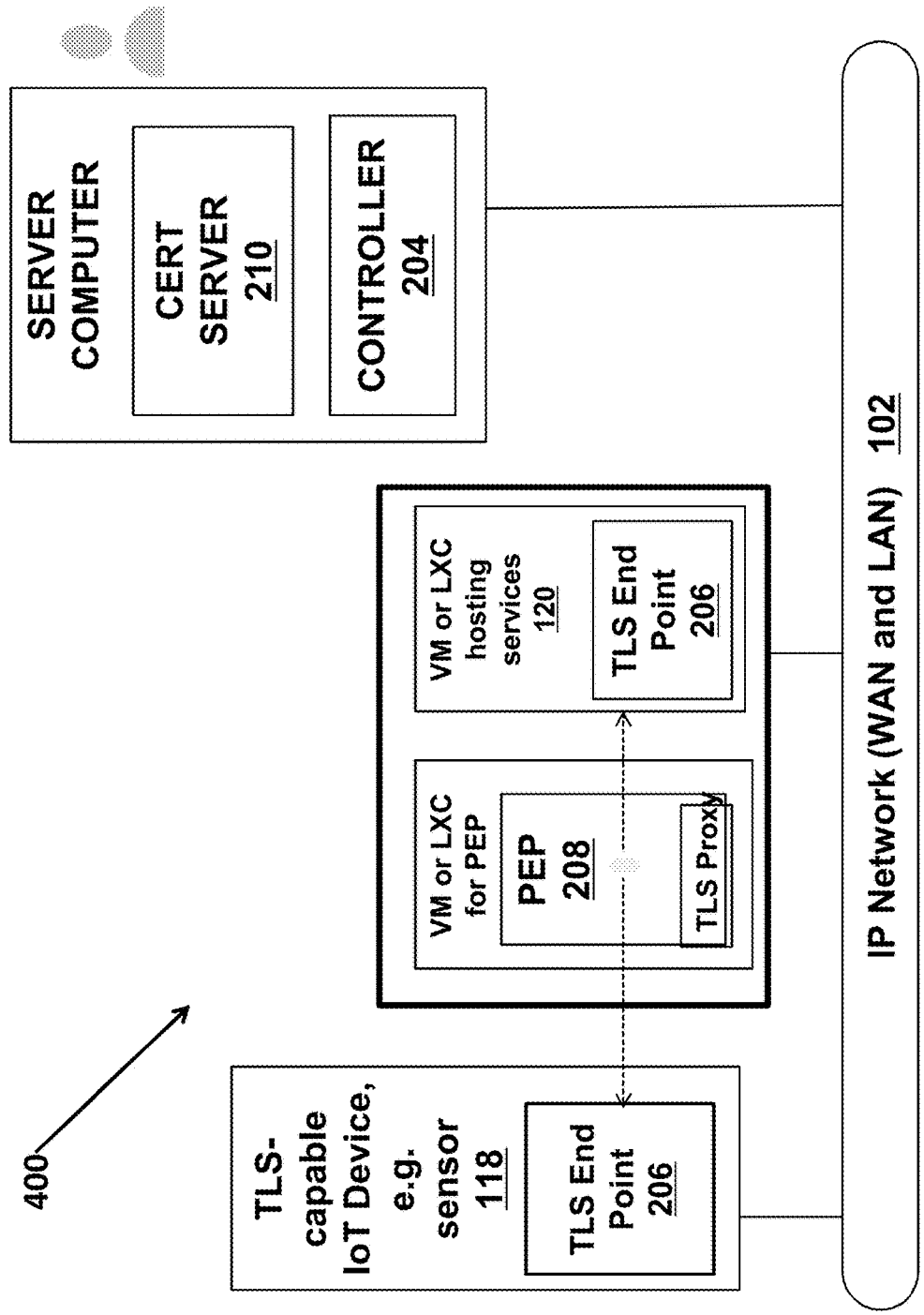
FIGS. 4 and 5 illustrate more details of the IoT device security mechanism system for transport layer security ("TLS") capable devices and non-TLS capable devices.

FIG. 4 illustrates more details of the IoT device security mechanism system 400 for certain types of IoT devices 118 known as TLS-capable devices. In the example in FIG. 4, each IoT device 118 and Service 120 is a TLS-capable device. A device 118 or Service 120 is TLS-capable if the device 118 or the computer system on which the Service 120 is operating has a TLS communication software stack and a certificate storage. In general, most IP devices and typical IoT devices are TLS-capable. However, the enterprise infrastructure may use many non-IP devices such as BlueTooth or USB devices that are not IP-capable. In the system described herein, when a new device or service is added to the enterprise infrastructure, a user/administrator may configure the new device or service and set the configuration for TLS-capable and non-TLS-capable devices.

The system 400 may have the controller 204 as described above as well as the certification server 210 that may perform the same function of generating new unspoofable tags. In this system, the certification server 210 may receive an authentication key from each IoT device 118 or Service 120 that may be used to identify the assigned ID and unspoofable tags of that IoT device 118 or Service 120. For example, the authentication key may be, in different embodiments, a MAC address or a universally unique identifier (UUID) that is assigned to each IoT device 118 or Service 120. If the IoT device is not part of an existing IoT device category in the system, the certification server 210 may generate a certificate with an ID and the unspoofable tag for the IoT device.

The security system may also have one or more policy enforcement points (PEPs) 208 adjacent each IoT device 118 or Service 120 that are each controlled by the controller 204 to enforce the security policy for each IoT device or Service. In the example in FIG. 4, there may be a PEP 208 associated with the Service 120 that monitors and controls communication by the Service 120. Each PEP may include a TLS proxy that downloads/enforces the TLS policy that may also be part of the security system. Each PEP may also perform filtering and monitoring as shown in FIG. 8 and described in more detail below. As shown in FIG. 4, when a new IoT device is identified and an unspoofable tag is assigned to that new IoT device (either an already existing unspoofable tag if the new IoT device is part of a category of IoT devices already being managed by the security system or a new unspoofable tag if the new IoT is a new category), the PEP 208 is set up for that IoT device.

In the example in FIG. 4, the PEP 208 may be implemented as a plurality of lines of computer code/instructions executing on a virtual machine (VM) or Linux operating system container (LXC). The Service 120 may be hosted on a virtual machine (VM) or Linux operating system container (LXC) and may also execute the TLS end point 206 that may be a plurality of lines of computer code/instructions executed on/by the virtual machine (VM) or Linux operating system container (LXC). In the example in FIG. 4, the IP network 102 allows the various components to communicate with each other subject to the restrictions placed on certain communications by the security mechanism. In the example in FIG. 4, the communications between the IoT device 118 and the Service 120 are controlled by the TLS end points 206 and the PEP 208 based on the security policy for the particular IoT device 118.

Figure 5:
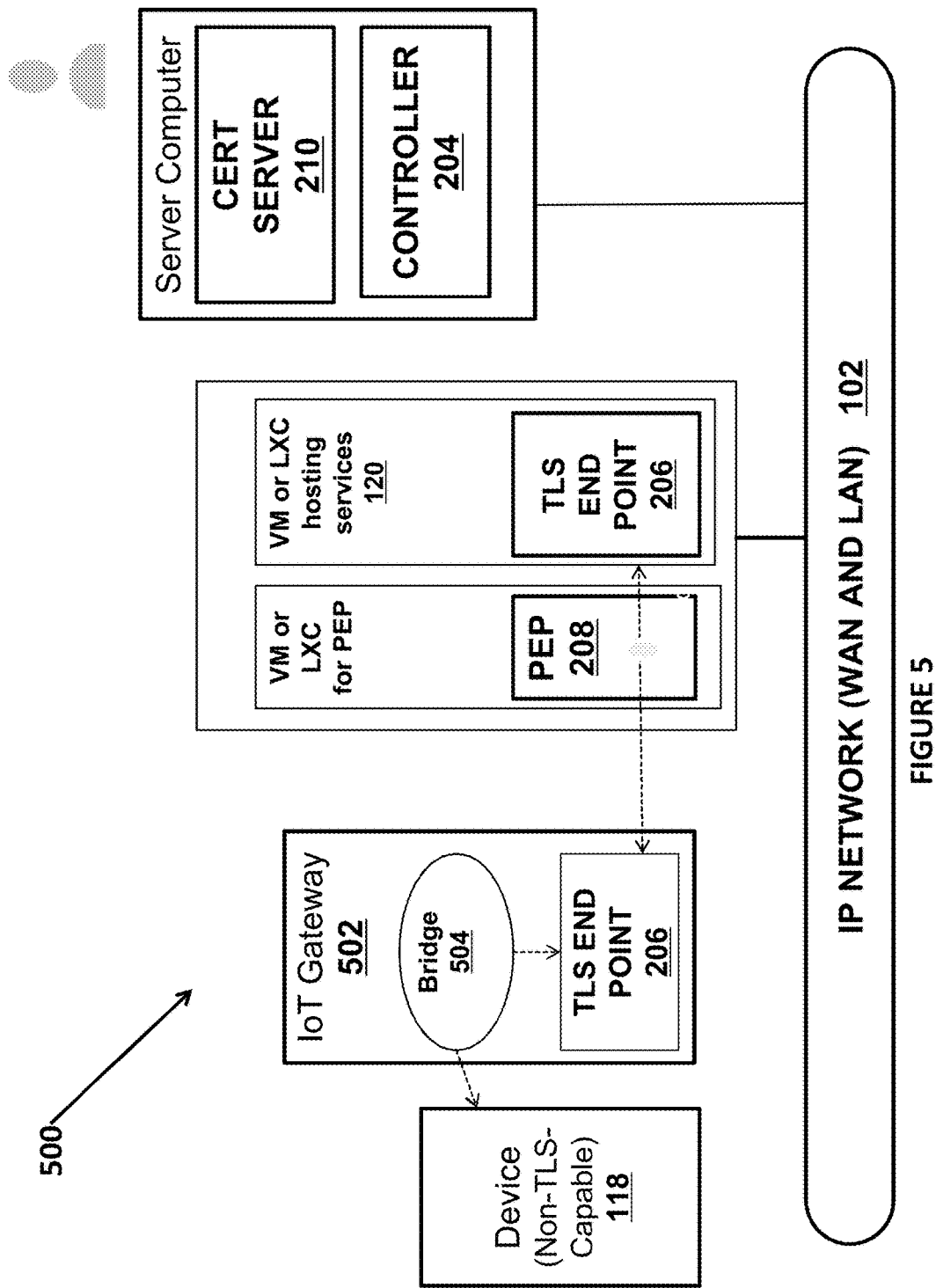

FIG. 5 illustrates more details of the IoT device security mechanism system 500 for non-TLS-capable devices. In this example, the system has the same elements as shown in FIG. 4 that operate in the same manner, but further includes an IoT gateway 502 and a bridge 504 in the IoT gateway 502 that hosts and executes the TLS end point 206 to enforce the security policy for a non-TLS capable device 118. A registration process of devices 118 and Services 120 is shown in FIG. 6 and described in more detail below. Thus, the system is able to enforce a security policy for both TLS capable devices (FIG. 4) and non-TLS capable devices (FIG. 5). The IoT gateway 502 may execute TLS communication on behalf of non-TLS-capable devices using the TLS end point 206. The IoT gateway 502 and bridge 504 may be a software implementation running on a Linux machine with device connection capability, such as for example USB or BlueTooth. The bridge 504 may include a plurality of lines of instructions/computer code that may be executed by a processor to configure the processor to communicate with a device through USB or BlueTooth. The bridge 504 may also communicate with services over TLS.

In summary, the system provides the security mechanism 202 (implemented using one or more PEPs 208, one or more TLS end points 206, the optional IoT gateway 502, the controller 204 and the cert server 210) covers the end-to-end infrastructure and can be monitored and controlled by the corporate IT. Using the security mechanism, the corporate IT will be able to monitor/control all the TLS traffic with the less secure IoT devices 118. Thus, with the network-wide, application-level control and monitoring capability, the corporate IT will be able to achieve both security and agility.

FIG. 6 illustrates a device registration method for an IoT device 118 using the certification server 210 that may further include a database that stores/maintains the authentication keys, IDs and tag for the devices/services that are part of the system. In the process, an IT administrator may request a device registration form from the certification server that returns a device registration form, such as a web page. In response to the form, the IT administrator may send an authentication key for a new device/service, an identifier (ID) of the new device/service and one or more tags assigned to the new device 118 or service 120. The certification server may then store that data about the new device/service and confirm that the new device 118 or service 120 can be authenticated and used in the system. If the new device or service does not have a valid certificate, it may automatically initiate a process of requesting a certificate by sending the authentication key and public encryption key to the certification server 210. The certification server 210 may then retrieve the ID and tags associated with the received authentication key (AuthKey) and generate and return a certificate for the new device 118 or service 120. The generated certificate may include the ID, tags and public key of the device or service.

FIG. 7 illustrates a method for policy administration and distribution using the certification server 210 that may further include the policy store that stores/maintains the security policy/rule data/files. In the process, an IT administrator may request a policy upload form that is sent to the controller 204 of the security system which returns a policy upload form, such as a web page. In response to the form, the IT administrator may upload a new policy file (that may include only a new policy or a complete set of new policies for all devices/services of the system) to the controller 204. The policy store may store the uploaded policy file. During the process, each PEP 208 may periodically, such as once every five minutes, execute a policy update process in which the security policy/rule being used by the particular PEP is updated. During the update, the PEP contacts the controller and gets the most current policy file.

FIG. 8 illustrates a method for monitoring and policy enforcement on communications between devices 118 and Services 120 using the TLS end points 206 of the security mechanism. The PEP 208 may have an IP address IP1 and one of the devices 118 or Services 120 may have an IP address IP11. In the example in FIG. 8, the PEP 208 has a port forwarding setting so that TCP IP1:P1 is forwarded to IP11:P11. The purpose of setting the port forwarding is to make all TLS communications to the right-side of the device 118 (or Service 120) in FIG. 8 go through PEP 208. Without this forwarding rule, the security policy cannot be enforced, because PEP 208 is the point of policy enforcement. Thus, in the process, a TCP connection is established between the two devices/services and a client hello communication is sent from one device to the other device/service. The device/ service (a server in this example) sends back a hello, sends its certificate to the other device and requests the certificate of the first device (client in this example). During this exchange, the PEP 208 may perform process 1. During process 1, the PEP 208 may extract the ID and tag of the server from the server certificate.

The client sends its client certificate, performs a client key exchange and verifies the certificate to the server. During this exchange, the PEP 208 may perform process 2. During process 2, the PEP 208 may verify the client certificate, extract the ID and tags from the client certificate and determine if the communications is permitted given the security policy/rule. To determine if the communication is permitted, the PEP may get the "require" parameters specified for the responder's tag (the client device) from the policy file stored in the PEP 208. If one of the initiator's tags is included in the "require" parameters, the communication is permitted. If not, the communication is blocked. The PEP 208 may then generate a log of the session information and if the communication should be denied, disconnects the TCP connection in a known manner.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc., found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc., that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc., may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A security method for an enterprise infrastructure:
determining a particular unspoofable tag assigned to a particular internet of things (IoT) device in a category of IoT devices that is part of an enterprise infrastructure, wherein each unspoofable tag is assigned to a plurality of IoT devices in the category and each unspoofable tag is certified by a public key certificate that cannot be faked;

retrieving a particular security policy rule assigned to the particular unspoofable tag from a policy rule engine, the policy rule engine having a plurality of security policy rules wherein each security policy rule is assigned to each category of IoT devices, the particular security policy rule defining a security access policy for the particular category of IoT devices;

verifying a certificate of particular category of IoT devices, extracting, an identifier and a tag from the certificate of the particular category of IoT devices and determining whether to permit a communication between the particular category of IoT devices and other category of IoT devices based on the tags of the particular category of IoT devices and the other category of IoT devices; and implementing a security policy for the particular category of IoT devices in the enterprise infrastructure using the particular security policy rule, the security policy controlling the communications between the particular category of IoT devices and other category of IoT devices of the enterprise infrastructure.

2. The method of claim 1 further comprising assigning an existing unspoofable tag when the particular IoT device is part of a category of IoT devices to which the existing unspoofable tag is already assigned.

3. The method of claim 1 further comprising generating a new unspoofable tag for the particular IoT device when the particular IoT device does not belong to an existing category of IoT device to which an unspoofable tag is already assigned.

4. The method of claim 3, wherein generating the new unspoofable tag further comprises generating the new unspoofable tag based on an authentication key of the particular IoT device.

5. The method of claim 4, wherein the authentication key is one of a media access control (MAC) address of the particular IoT device and an universally unique identifier of the particular IoT device.

6. The method of claim 4, wherein generating the new unspoofable tag further comprises generating a public key certificate for the new unspoofable tag.

7. The method of claim 3 further comprising providing a security policy rule assigned to the new unspoofable tag.

8. The method of claim 1, wherein implementing the security policy further comprises deploying a policy enforcement point adjacent the particular IoT device to implement the security policy for the particular IoT device.

9. The method of claim 8, wherein implementing the security policy further comprises deploying a transport layer end point adjacent the particular IoT device.

10. The method of claim 1, wherein each security policy rule is an access rule.

11. The method of claim 10, wherein the access rule is a whitelist.

12. The method of claim 1, wherein determining whether to permit the communication further comprises retrieving a tag for the other category of IoT devices, and comparing a require parameter in the tag of the other category of IoT devices to the tag of the particular category of IoT devices.

13. The method of claim 12, wherein comparing the required parameter in the tag of the other category of IoT devices to the tag of the particular category of IoT devices further comprises permitting the communication between the particular category of IoT devices and the other category of IoT devices if the tag of the particular category of IoT devices matches a tag in the require parameter of the other category of IoT devices.

14. An apparatus, comprising:
a transport layer service (TLS) element that is coupled to an infrastructure, the infrastructure having a plurality of internet of things (IoT) device that form part of the infrastructure;

the TLS element having a controller that enforces a security policy rule for each IoT device that is part of the infrastructure;

the TLS element having a tag engine that determines a particular unspoofable tag assigned to a particular IoT device in a category of IoT devices, wherein each unspoofable tag is assigned to a plurality of IoT devices in the category and each unspoofable tag is certified by a public key certificate that cannot be faked;

the TLS element having a security policy rule engine from which a particular security policy rule assigned to the particular unspoofable tag is retrieved, the policy rule engine having a plurality of security policy rules wherein each security policy rule is assigned to each category of IoT devices, the particular security policy rule defining a security access policy for the particular category of IoT devices;

the TLS element having a policy enforcement point connected to the controller that is capable of verifying a certificate of the particular category of IoT devices, extracting an identifier and a tag from the certificate of the particular category of IoT devices and determining whether to permit a communication between the particular category of IoT devices and the other category of IoT devices based on the tags of the particular category of IoT devices and the other category of IoT devices; and the TLS element configured to implement a security policy for the particular category of IoT devices across the infrastructure using the particular security policy rule, the security policy controlling the communications between the particular category of IoT devices and other category of IoT devices of the enterprise infrastructure.

15. The apparatus of claim 14, wherein the tag engine is configured to assign an existing unspoofable tag when the particular IoT device is part of a category of IoT devices to which the existing unspoofable tag is already assigned.

16. The apparatus of claim 14, wherein the tag engine is configured to generate a new unspoofable tag for the particular IoT device when the particular IoT device does not belong to an existing category of IoT device to which an unspoofable tag is already assigned.

17. The apparatus of claim 16, wherein the tag engine generates the new unspoofable tag based on an authentication key of the particular IoT device.

18. The apparatus of claim 17, wherein the authentication key is one of a media access control (MAC) address of the particular IoT device and an universally unique identifier of the particular IoT device.

19. The apparatus of claim 17, wherein the tag engine generates a public key certificate for the new unspoofable tag.

20. The apparatus of claim 16, wherein the security policy engine is configured to provide a security policy rule assigned to the new unspoofable tag.

21. The apparatus of claim 14 further comprising a policy enforcement point coupled to the controller that is configured to be deployed adjacent the particular IoT device to implement the security policy for the particular IoT device.

22. The apparatus of claim 21 further comprising a transport layer end point that is configured to be deployed adjacent the policy enforcement point.

23. The apparatus of claim 14, wherein each security policy rule is an access rule.

24. The apparatus of claim 23, wherein the access rule is a whitelist.

25. The apparatus of claim 14, wherein the policy enforcement point is capable of retrieving a tag for the other category of IoT devices, and comparing a require parameter in the tag of the other category of IoT devices to the tag of the particular category of IoT devices.

26. The apparatus of claim 25, wherein the policy enforcement point is capable of permitting the communication between the particular category of IoT devices and the other category of IoT devices if the tag of the particular category of IoT devices matches a tag in the require parameter of the other category of IoT devices.

27. A method for security for an internet of things (IoT) device in an enterprise infrastructure, the method comprising:
  identifying an IoT device that is part of an enterprise infrastructure;
  determining a particular unspoofable tag assigned to the discovered IoT device in a category of IoT devices, wherein each unspoofable tag is assigned to a plurality of IoT devices in the category and each unspoofable tag is certified by a public key certificate that cannot be faked;
  identifying a particular security policy rule assigned to the particular unspoofable tag from a policy rule engine, the policy rule engine having a plurality of security policy rules wherein each security policy rule is assigned to each category of IoT devices, the particular security policy rule defining a security policy for the particular category of IoT devices wherein the particular security policy rule implements enterprise infrastructure security for the discovered IoT device; and
  verifying a certificate of particular category of IoT devices, extracting, an identifier and a tag from the certificate of the particular category of IoT devices and determining whether to permit a communication between the particular category of IoT devices and other category of IoT devices based on the tags of the particular category of IoT devices and the other category of IoT devices.

28. The method of claim 27, wherein identifying the particular security policy rule assigned to the particular unspoofable tag further comprises assigning the particular security policy rule from the plurality of security policy rules in the policy engine.

29. The method of claim 27, wherein identifying the particular security policy rule assigned to the particular unspoofable tag further comprises generating a new security policy rule for the discovered IoT device and storing the new security policy rule in the policy engine.

30. The method of claim 27, wherein determining a particular unspoofable tag assigned to the discovered IoT device further comprises assigning an existing unspoofable tag to the discovered IoT device when the IoT device is part of an existing category of IoT devices.

31. The method of claim 27, wherein determining a particular unspoofable tag assigned to the discovered IoT device further comprises generating a new unspoofable tag to the discovered IoT device when the IoT device is not part of an existing category of IoT devices.

32. The method of claim 31, wherein identifying the particular security policy rule assigned to the new unspoofable tag further comprises generating a new security policy rule for the discovered IoT device and storing the new security policy rule in the policy engine.

* * * * *